324-77.                    SR 05-25-71        XR        3,581,207

[11] 3,581,207

[72] Inventor Robert W. Chang
82 Southview Terrace North, Middletown, N.J. 07748

[21] Appl. No. 847,881
[22] Filed Aug. 6, 1969
[45] Patented May 25, 1971

[54] JOINT SETTING OF DEMODULATING CARRIER PHASE, SAMPLING TIME AND EQUALIZER GAIN PARAMETERS IN SYNCHRONOUS DATA TRANSMISSION SYSTEMS

10 Claims, 4 Drawing Figs.

[52] U.S. Cl. .......... 325/42, 324/77, 325/324, 333/18
[51] Int. Cl. .......... H04b 1/00
[50] Field of Search .......... 324/77 H; 79; 325/42, 44, 67, 133, 324; 333/18, 19, 70 T

[56] References Cited

UNITED STATES PATENTS 3,400,332 9/1968 O'Neill et al. .......... 333/18
3,403,340 9/1968 Becker et al. .......... 325/42
3,508,172 4/1970 Kretzmer et al. .......... 333/18

*Primary Examiner*—Robert L. Richardson
*Assistant Examiner*—Albert J. Mayer
*Attorneys*—R. J. Guenther and Kenneth B. Hamlin

ABSTRACT: Apparatus and method for the joint setting in synchronous digital data transmission systems of the parameters of demodulating carrier phase, sampling time and transversal equalizer tap gains based on a common mean-square error minimization criterion. Responsive to test pulses traversing a distorting transmission medium and locally generated test pulses traversing an ideal filter simultaneous correlations are made with each equalizer tap output and the error difference between actual and ideal responses to control gap tap gains, with the derivative of the ideal response and the received signal to control sampling time, and with a quadrature transform of the received signal and the ideal response to control demodulating carrier phase. Optimum control of these critical parameters is thereby guaranteed.

INVENTOR
R. W. CHANG
BY J. P. Kearns
ATTORNEY

JOINT SETTING OF DEMODULATING CARRIER PHASE, SAMPLING TIME AND EQUALIZER GAIN PARAMETERS IN SYNCHRONOUS DATA TRANSMISSION SYSTEMS

FIELD OF THE INVENTION

This invention relates to synchronous digital data transmission systems and particularly to the coordination between the transmitter and the receiver in such systems of such critical parameters as carrier-wave phase, sampling time and equalizer gains.

BACKGROUND OF THE INVENTION

The transmission of digital data at high speeds over band-limited transmission channels, such as telephone voice channels, requires precision control over carrier-wave frequency and phase, and delay distortion to a degree far beyond that necessitated by, or normally provided for, voice transmission alone. In addition, data transmission requires control of symbol and bit timing which are unknown to voice transmission. Prior solutions to the problem of control of diverse critical parameters in data transmission systems have largely proceeded on the basis that, although adjustments of the several parameters are necessarily interrelated, each one can nevertheless be controlled according to independent criteria and upon optimization of the individual parameters, the overall system will also be optimized. For example, a high-speed data transmission system disclosed by F. K. Becker in U.S. Pat. No. 3,401,342 issued Sept. 10, 1968 requires for its most efficient operating mode carrier-wave phase and frequency control, automatic gain control, symbol and bit timing phase control, automatic equalizer conditioning, multilevel encoding and error control. Although the disclosed data transmission system employs vestigial sideband transmission in which the carrier wave is largely suppressed, it is necessary during a start-up sequence to transmit a burst of pure carrier frequency to align the receiver local oscillator with the transmitter oscillator. Carrier phasing is thus achieved, at least initially, independently of any other system operations. Thereafter, a series of test pulses accompanied by band-edge pilot tones are transmitted for coarse automatic equalizer and initial timing adjustments without further carrier-wave adjustment. Symbol timing is locked to the peaks of the received test pulses. The automatic gain control is set in accordance with the amplitude of the received lower band-edge pilot tones. Finally, message data is transmitted and bit timing and equalizer control is further effected from data transitions and samples. While there is indeed interaction among these several adjustments and adjustment of one parameter is not without influence on the adjustment of another, nevertheless individual performance criteria are applied to each adjustment. Excellent results have been obtained with the described system. However, there is no way of guaranteeing that these results are optimal without a unifying performance standard.

It is an object of this invention to improve the coordination of the control of diverse parameters in digital data transmission by applying a common performance criterion to all such adjustments.

It is a further object of this invention to set diverse parameters in digital data transmission systems with a minimum of circuit complexity.

It is another object of this invention to optimize the settings of diverse parameters in digital data transmission systems.

SUMMARY OF THE INVENTION

According to this invention, certain critical parameters in the receiver for an amplitude-modulated digital data transmission system with coherent or synchronous detection are jointly and simultaneously set conformable to a common performance criterion. The minimization of the mean-square error between the actual impulse response of the system and a desired impulse response is the performance criterion chosen. The system receiver includes a local demodulating carrier source, symbol and bit timing circuits and a multitap transversal equalizer. The parameters to be set are the demodulating carrier phase, timing circuit phase and equalizer tap gains. The transmission system itself may use single-sideband, double-sideband or vestigial-sideband modulation techniques.

Joint setting of the selected parameters is accomplished in a training interval prior to message transmission by transmitting a first plurality of test pulses widely spaced with respect to the intended message signal rate through the transmission medium which gives rise to distortions of amplitude and phase relative to frequency and a second plurality of matching test pulses generated at the receiver through an ideal shaping filter. The respective impulse responses of the overall system including the automatic equalizer to the first plurality of test pulses and of the ideal filter to the second plurality of test pulses are compared to obtain a measure of the mean-square system error. This mean-square error measure is correlated with tap outputs of the equalizer to control the weights applied to each tap output. These tap correlations are equivalent to taking the partial derivative of the mean-square error with respect to each tap output.

At the same time the time derivative of the ideal response is correlated with the equalizer output to obtain a measure of the sampling time phase error in the receiver timing circuits. This equivalent partial derivative of the mean-square error with respect to the timing phase is used to adjust the timing circuits.

Concurrently also with the adjustment of equalizer tap weights and receiver sampling time the Hilbert transform (or quadrature phase shift) of the ideal impulse response is correlated with the equalizer output in the case of single-sideband modulation to obtain a measure of the demodulating carrier phase error. This equivalent partial derivative of the mean-square error with respect to the demodulating carrier phase is used to control the local oscillator phase. In the case of double-sideband and vestigial-sideband modulation, the partial derivative of the mean-square error with respect to the demodulating carrier phase must be obtained by a two-step process. First, the difference between the actual and ideal response is obtained by using the regular demodulating carrier wave, and secondly, the system response when the quadrature of the demodulation carrier wave is used. These two components are obtained by sending consecutive test pulses. The correlation of the first difference in responses with the second quadrature demodulation then determines the partial derivative required for control of the demodulating carrier phase.

In accordance with whether the partial derivative determined in any case is greater or less than zero, the affected parameter is adjusted in a decreasing or increasing direction.

It is a feature of this invention that the same ideal response generated in an equalized digital data transmission system for the purpose of controlling equalizer tap weighting can also be employed to control in a coordinated fashion other critical parameters necessary to the optimum detection of received data.

DESCRIPTION OF THE DRAWING

The foregoing and other objects and features of the invention will become apparent from the following detailed description when read in conjunction with the accompanying drawings in which.

DETAILED DESCRIPTION

Figure 1:
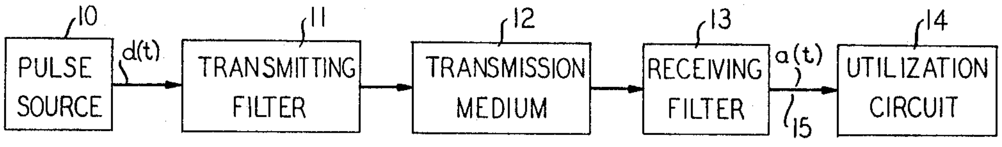
FIG. 1 is a block diagram of a representative digital data transmission system to which this invention is applicable.

FIG. 1 illustrates a typical digital data transmission system employing amplitude modulation with coherent or synchronous detection. Such a system comprises broadly a pulse source 10, a transmitting filter 11, a transmission medium 12, a receiving filter 13 and a utilization circuit 14. Pulse source 10 may emit message data pulses at a synchronous rate or standardized test pulses at a subsynchronous rate employed to condition the receiver for reception of data at the synchronous rate. Transmission medium 12 may comprise a voiceband telephone channel utilizing wire, cable or radio segments in various combinations from message to message. An individual channel in such a medium will be band-limited, as is well known, and in order to match the frequency components of pulse signals to these band limits transmitting and receiving filters 11 and 13 are required to confine these components to the available bandwidth and also to exclude out-of-band noise components. The overall impulse response of the transmission system is determined by these filters. As a given transmission medium may have baseband and passband channels these filters also serve to confine signals transmitted in parallel to their assigned channels and thus avoid crosstalk between channels. Accordingly, filters 11 and 13 may be understood to include, as necessary, modulating and demodulating apparatus. Utilization circuit 14 may comprise such amplitude, timing and equalizing control apparatus as is necessary to recover the signals intended to be conveyed from the transmitter location to the receiver location.

Figure 2:
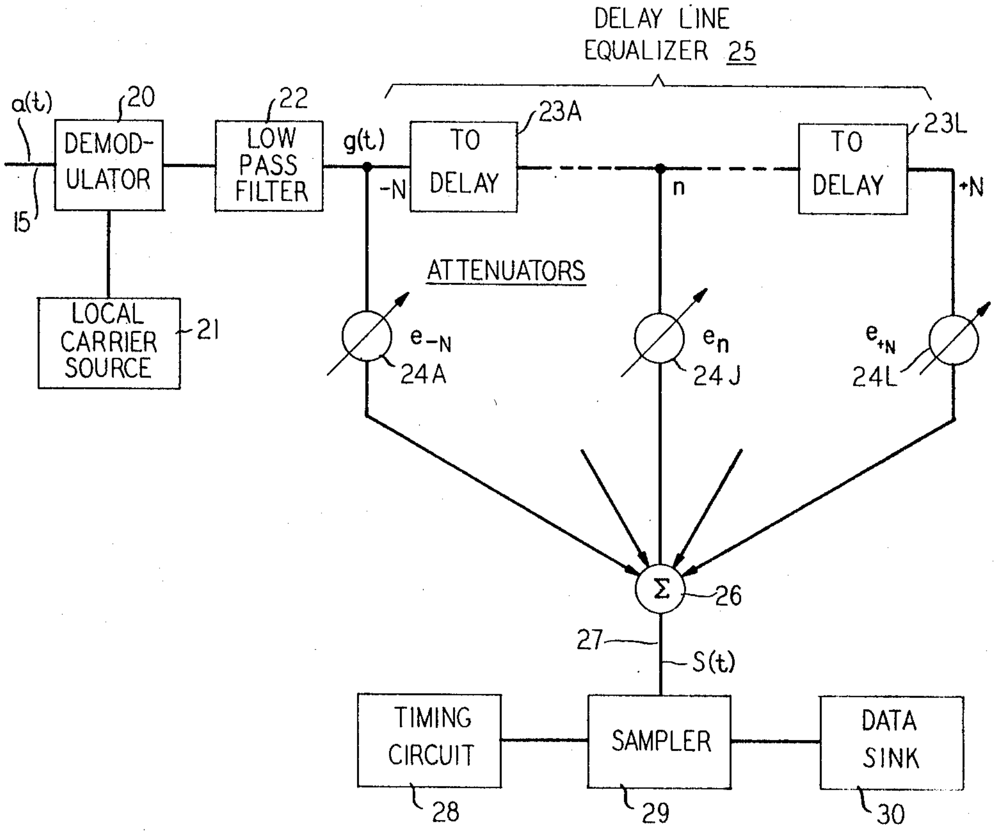
FIG. 2 is a block diagram of the receiver for a known digital data transmission system provided with an automatic transversal equalizer.

Whenever an impulse $d(t)$, which may alternatively be a test or a message pulse, is applied to the input of the transmitting filter 11, a signal $a(t)$ is produced at the output of receiving filter 13 on line 15. On the assumption that the received signal $a(t)$ is band-limited, its Fourier transform $A(f)$ is also band-limited. The lower and upper band-edge frequencies are designated $f_1$ and $f_2$, respectively. These frequencies define the band limits of a particular channel in transmission medium 12.

Where the frequencies $f_1$ and $f_2$ define a passband channel in medium 12, then the output of the receiving filter must be demodulated down to baseband, as is indicated in FIG. 2. FIG. 2 represents a typical data receiver which includes an automatic transversal equalizer. This receiver comprises demodulator 20, local carrier-wave source 21, low-pass filter 22, equalizer 25, timing circuit 28, sampling circuit 29 and data sink 30. The receiver signal $a(t)$ on input 15 is multiplied in demodulator 20 by the carrier-frequency output $f_c$ of local carrier-wave source 21. Since the carrier frequency is largely suppressed at the transmitter in most data transmission systems, the carrier frequency is conventionally recovered from transmitted pilot tones. Inasmuch as the output of demodulator 20 contains both sum and difference frequencies, the sum frequencies are eliminated in low-pass filter 22 to produce the single sideband $g(t)$ at baseband level with the highest frequency $f_o$. The signal $g(t)$ contains amplitude and phase distortions imparted by the medium. The resultant intersymbol interferences are best minimized by an equalizer, particularly where high-speed data is being transmitted.

Equalizer 25 may advantageously be of the mean-square type disclosed in U.S. Pat. No. 3,375,473 issued to R. W. Lucky on Mar. 26, 1968. This equalizer includes a delay line with taps spaced at $T_o$-second intervals, where $T_o$ is the reciprocal of twice the highest frequency $f_o$ being transmitted. There are typically 2N+1 taps at each of which an attenuator, such as attenuators 24A through 24L, is provided. The gain of the center or reference tap may be fixed or regulated at unity while the other gains are adjustable over a range of plus and minus unity. The attenuated or weighted outputs of all the taps are combined in a summing circuit 26 to form an output signal. The tap gains are designated $e_n$, where $n$ is the index number of the taps in the range of ±N.

When an impulse $d(t)$ is applied at the transmitter input, the transversal equalizer output on lead 27 becomes $s(t)$, the overall system impulse response including the response of medium 12 and filters 11 and 13.

In the receiver of FIG. 2 timing circuit 28 furnishes sampling pulses at the synchronous baud (symbol) rate to sampler 29, which operates on the signal $s(t)$ on lead 27 to reconstruct data for delivery to data sink 30.

In order to recover high-speed data in the receiver of FIG. 2 several important parameters must be coordinated with similar parameters found in the transmitter. The critical parameters include carrier phase, timing phase and equalizer tap gains. The demodulating carrier frequency generated in carrier source 21 is conventionally synchronized with the transmitter frequency by means of manipulations on transmitted pilot tones having some predetermined fixed relationship with the carrier frequency. However, since the pilot tones may suffer a delay in transmission different from that which the carrier wave would have suffered if transmitted, the correct demodulating phase is not accurately reproduced. Additional adjustments controlled by monitoring for the presence of certain low frequency components in the received signal, for example, have been required.

The timing phase, which determines sampling instants, has conventionally been recovered and controlled by monitoring the occurrence of data transitions and arbitrarily placing the sampling instants midway between transitions. However, the waveforms of recovered signals may not be symmetrical within signaling intervals and hence sampling at the center of signaling intervals may not be optimum.

A coordinated common standard, on which to base the control of such critical system parameters as those mentioned above, is available in the mean-square error standard established for equalizer adjustment in U.S. Pat. No. 3,375,473 cited above. A desired or ideal impulse response is generated at the receiver for the data transmission system to be optimized. Let this prescribed impulse response be designated $q(t)$. This response can be compared with the actual response $s(t)$ of the transmission system, as presented on lead 27 of FIG. 2 at the equalizer output. As there is an inevitable time difference between the actual response and the ideal response, the ideal response is allowed a time shift with respect to transmitted pulses of $t_o$. The term $t_o$, as will be seen, is equivalent to sampling time. The complete ideal response becomes $q(t-t_o)$. The mean-square difference between the actual and ideal responses can thus be written $$E=\int_{-\infty}^{\infty}[s(t)-q(t-t_0)]^2dt \quad (1)$$

Since the ideal response $q(t-t_o)$ depends on sampling time $t_o$ and the actual response $s(t)$ depends on demodulating carrier phase $\theta$ and the set of equalizer tap o $e_n$, the error difference $E$ of equation (1) necessarily is a function of $t_o$, $\theta$ and $e_n$. If the values of $t_o$, $\theta$ and $e_n$ which minimize $E$ are designated $t_o^*$, $\theta^*$ and $e_n^*$, then it can be shown that $t_o^*$ depends on $\theta$ and $e_n$; $\theta^*$ depends on $t_o$ and $e_n$; and $e_n^*$ depends on $t_o$ and $\theta$. Therefore, it is not possible to set these parameters optimally by independent adjustments. The parameters $t_o$, $\theta$ and $e_n$ must be set jointly in order to minimize $E$.

For purposes of illustration the analysis will be continued on the assumption of an amplitude-modulated data transmission system transmitting Class IV partial-response signals at a baud or symbol rate equal to the theoretically maximum Nyquist rate of two symbols per Hertz of bandwidth. Class IV partial-response signals are described in U.S. Pat. 3,388,330, issued June 11, 1968, to E. R. Kretzmer. Class IV partial-response signals are characterized by an impulse response $s(t)$ at sampling instants ($t_o+kT_o$, where $k$ is any integer and $T_o$ is the reciprocal of twice the highest frequency in the signaling baseband) having these values

...0,0,1,0,−1,0,0,...

If the desired sampling values are denoted by the set $q_k$, then $q_k=1$, for $k=-1$ $=-1$, for $k=+1$ =0, for all other $k$, including particularly $k$=0.

The time samples at $T_o$ times of the actual signal $s(t)$ are denoted $s_k$. Desired operation is achieved if $s_k = q_k$ for all $k$. In practice it is not possible to achieve this, but the differences between $s_k$ and $q_k$ can be minimized by proper control of $\theta$, $t_o$ and $e_n$. A proper criterion is the minimization of the error $$E_0 = \sum_{k=-\infty}^{\infty} (s_k - q_k)^2 \qquad (2)$$

By the sampling theorem, equation (2) can be rewritten as $$E_0 = \frac{1}{T_0} \int_{-\infty}^{\infty} [s(t) - q(t-t_0)]^2 dt \qquad (3)$$

where $q(t)$ is the same as $q(kT_o) = q_k$ for $k$ any integer.

It is apparent that equations (1) and (3) are the same except for the factor $1/T_o$, which is a constant in any synchronous data transmission system.

In a single-sideband system only one sideband is transmitted and the carrier-wave frequency $f_c$ is completely suppressed. The position of the carrier frequency does not overlap the transmitted bandwidth $f_1$ to $f_2$ and therefore may be either below $f_1$ or above $f_2$. Assume $f_c \leqq f_1$, and that the upper sideband is being transmitted. Then the demodulated and filtered output of demodulator 20 and low-pass filter 22 of FIG. 2 may be written $g(t) = a(t)\cos(2\pi f_c t + \theta) + \hat{a}(t)\sin(2\pi f_c t + \theta)$, (4). where $\hat{a}(t)$ is the Hilbert transform of received signal $a(t)$ and the sine and cosine terms represent quadrature-related components of the demodulating carrier wave. Hilbert transforms, as discussed in more detail in Chapter 19 of Y. W. Lee's "-Statistical Theory of Communication" (John Wiley & Sons, Inc., New York, 1960), are mathematical expressions relating the real and imaginary parts of electrical system functions to their odd and even components. Their use, as here, simplifies certain types of transmission system analysis.

It is apparent from FIG. 2 that $$s(t) = \sum_{n=-N}^{N} e_n g(t - nT_0 - NT_0) \qquad (5)$$

The Hilbert transform of equation (5) is $$\hat{s}(t) = \sum_{n=-N}^{N} e_n \hat{g}(t - nT_0 - NT_0)$$
$$= \sum_{n=-N}^{N} e_n [\text{Hilb}\{\cos[2\pi f_c(t - nT_0 - NT_0) + \theta]\, a(t - nT_0 - NT_0)\} + \text{Hilb}\{\sin[2\pi f_c(t - nT_0 - NT_0) + \theta]\hat{a}(t - nT_0 - NT_0)\}] \qquad (6)$$

When only the upper sideband is being transmitted, the frequency spectrum of $a(t)$ does not overlap that of $\cos 2\pi f_c t$ and $\sin 2\pi f_c t$. Therefore, Hilb[$\cos(2\pi f_c t + \theta)a(t)$] $= \cos(2\pi f_c t + \theta)\hat{a}(t)$ and Hilb[$\sin(2\pi f_c t + \theta)\hat{a}(t)$] $= -\sin(2\pi f_c t + \theta)a(t)$.

Equation (6) becomes $$\hat{s}(t) = \sum_{n=-N}^{N} e_n \{\cos[2\pi f_c(t - nT_0 - NT_0) + \theta]\, \hat{a}(t - nT_0 - NT_0) - \sin[2\pi f_c(t - nT_0 - NT_0 + \theta]\, a(t - nT_0 - NT_0) \qquad (7)$$

It can be shown by combining equations (4) and (5) that equation (7) is identical to the partial derivative $\delta s(t)/\delta\theta$ of the actual system response to the demodulating carrier phase. From equation (1) it is also learned that, since $q(t-t_o)$ is independent of $\theta$, the partial derivative $\delta E/\delta\theta$ can be obtained as $$\frac{\partial E}{\partial \theta} = \int_{-\infty}^{\infty} 2[s(t) - q(t-t_0)] \frac{\partial s(t)}{\partial \theta} dt$$
$$= \int_{-\infty}^{\infty} 2[s(t) - q(t-t_0)]\hat{s}(t) dt \qquad (8)$$

Furthermore, a function $s(t)$ and its Hilbert transform $\hat{s}(t)$ are orthogonal, that is, their product is zero. Therefore, equation (8) reduces to $$\frac{\partial E}{\partial \theta} = -2\int_{-\infty}^{\infty} q(t-t_0)\hat{s}(t) dt = 2\int_{-\infty}^{\infty} s(t)\hat{q}(t-t_0) dt \qquad (9)$$

Thus, $\delta E/\delta\theta$ can be generated either by correlating either $q(t-t_0)$ with $\hat{s}(t)$, or equivalently $\hat{q}(t-t_0)$ with $s(t)$. The term $s(t)$ is available at the equalizer output lead 27 as shown in FIG. 2. The term $q(t-t_o)$ can be generated by shaping the output of a local pulse source as will be more fully explained in connection with FIG. 3. The Hilbert transform $\hat{q}(t-t_o)$ is readily obtained by passing $q(t-t_o)$ through an all-pass 90° phase shifter.

In the single-sideband case where the lower sideband only is transmitted, it can be shown that equation (9) holds with a reversal of sign. Thus, for $f_c \geqq f_2$, $$\frac{\partial E}{\partial \theta} = -2\int_{-\infty}^{\infty} s(t)\hat{q}(t-t_0) dt \qquad (10)$$

It may further be noted in equation (1) that the actual response $s(t)$ is independent of $t_o$ and also that the integration of $q^2(t-t_o)$ extends over all time. Therefore, the partial derivative of equation (1) with respect to sampling time $t_o$ is $$\frac{\partial E}{\partial t_0} = 2\int_{-\infty}^{\infty} s(t)\left[\frac{\partial}{\partial t} q(t-t_0)\right] dt \qquad (11)$$

Thus, the partial derivative $\delta E/\delta t_o$ can be generated by correlating the actual response $s(t)$ with the partial derivative of the ideal response.

Finally, from equations (1) and (5) the partial derivative of the error signal with respect to each equalizer tap gain can be written $$\frac{\partial E}{\partial e_n} = \int_{-\infty}^{\infty} 2[s(t) - q(t-t_0)] \frac{\partial s(t)}{\partial e_n} dt$$
$$= \int_{-\infty}^{\infty} 2[s(t) - q(t-t_0)] g(t - nT_0 - NT_0) dt \qquad (12)$$

The term in brackets in equation (12) is the error signal obtained by subtracting the desired signal response from the actual signal response. The $g$ term is available at successive equalizer taps.

Equations (11) and (12) are valid for controlling sampling time and equalizer tap gains regardless of the type of amplitude-modulation employed, SSB, DSB or VSB. However, equations (9) and (10) for controlling demodulating carrier phase are valid only for SSB systems. For DSB and VSB systems the carrier frequency lies within the transmission band and Hilbert transforms cannot be used in the same way. Analysis shows instead that the partial derivative of the error or difference signal with respect to the phase of the demodulating carrier wave becomes, in contrast with equation (8), $$\frac{\partial E}{\partial \theta} = \int_{-\infty}^{\infty} 2[s(t) - q(t-t_0)]\underline{s(t)} dt \qquad (13)$$

where $s(t)$ is not the Hilbert transform of $s(t)$, but is the actual response at the equalizer output when the demodulating carrier wave is phase shifted by 90°.

Figure 3:
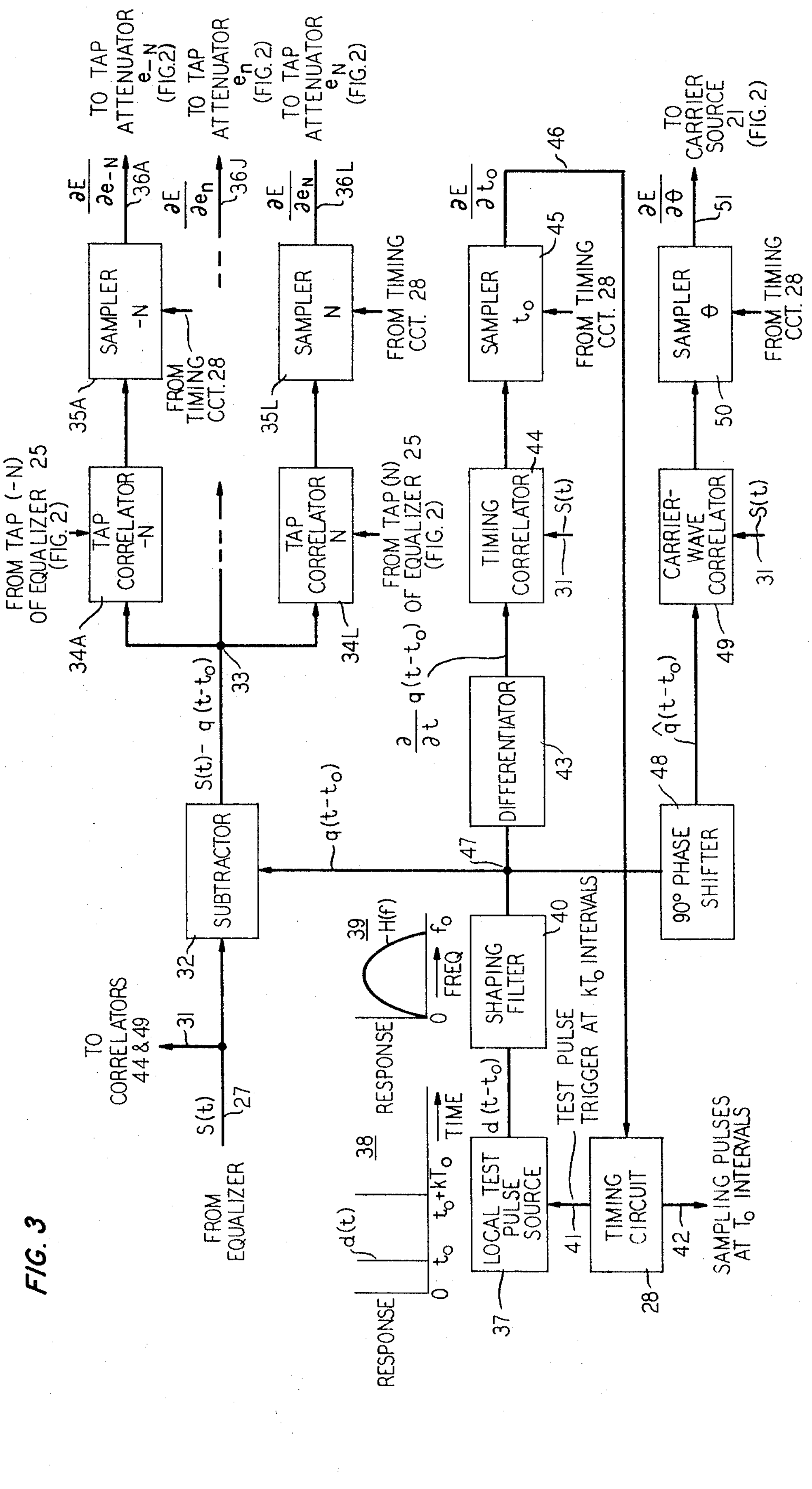
FIG. 3 is a more detailed block diagram of the receiver for a typical equalized single-sideband modulated digital data transmission system modified according to this invention to set jointly with equalizer tap weights the additional parameters of demodulating carrier phase and sampling time.

FIG. 3 is a block diagram of apparatus for implementing equations (9) or (10), (11) and (12) simultaneously. FIG. 3 is a modification of FIG. 2 as necessary to show a complete embodiment for joint setting of the parameters $\theta$, $t_o$ and $e_n$ in a single-sideband data transmission system. The apparatus comprises subtractor 32, tap correlators 34, local test pulse source 37, shaping filter 40, differentiator 43, phase shifter 48, timing-wave correlator 44, carrier-wave correlator 49 and samplers 35, 45 and 50. Timing circuit 28 is repeated from FIG. 2.

On input lead 27 there are applied the actual responses $s(t)$ to test pulses which have traversed transmission channel 12, filters 11 and 13 of FIG. 1 and equalizer 25 of FIG. 2. Local test pulse source 37 generates test pulses substantially identical to the transmitted test pulses under the control of timing circuit 28. Timing circuit 28 normally operates at the baud rate $1/T_o$, but during the setup time operates at a much lower rate $1/kT_o$, where $k$ may be of the order of 20 or 30 so that each test pulse will be truly independent in response with respect to all others. Each test pulse has its response shaped in filter 40 in accordance with a desired response. For the assumed Class IV partial-response format the desired waveshape $H(f)$ is that of half a sine wave with cutoffs at zero and the maximum band-edge frequency $f_o$, as shown at 39 in FIG. 3. At 38 in FIG. 3 is shown the time response of the test pulses $d(t-t_0)$, where $t_0$ is to be controlled. The shaped pulses from filter 40 appear at junction 47 as the waveform $q(t-t_o)$. This waveform is subtracted in subtractor 32 from the received signal $s(t)$ on lead 27 to form the difference signal $[s(t)-q(t-t_o)]$ at junction 33. Subtractor 32 is a conventional linear differencing circuit. The difference signal at junction 33 is applied in parallel to a plurality of correlators 34, which receive signals also from the respective taps on equalizer 25 shown in FIG. 2. Correlator 34A, for example, receives signals from the leftmost ($-N$) tap on equalizer 25 and correlator 34L receives signals from the rightmost tap ($+N$). The presence of other correlators is implied by the dashed line from junction 33. Each correlator, in the case of digital signals, includes a multiplier and an integrator, such as a low-pass filter so that the input signal is inverted or not according to the polarity of the tap voltage and averaged as disclosed in more detail in the aforesaid Lucky patent.

The respective outputs of correlators 34 are sampled at the baud rate during normal message transmission and at the test pulse rate during setup in accordance with timing or sampling pulses from timing circuit 28 in samples 35, which are individually associated with correlators 34. The outputs of samplers 35 appearing on leads 36 are then partial derivatives of the integral of difference signal at junction 33 with respect to the equalizer tap signals in accordance with equation (12) above. These partial derivatives are in turn applied to the corresponding attenuators 24 in FIG. 2 to adjust them up or down in a direction to minimize the difference signal at junction 33. The adjustments to attenuators 24 may be either proportional to the magnitude of the derivatives or incremented in accordance with the sign or polarity of the derivative. The latter alternative is somewhat simpler to implement, as is taught by Lucky.

The desired signal at junction 47 of FIG. 3 is also differentiated in differentiator 43, an RC circuit, to form the partial derivative of such signal with respect to time. This derivative signal is correlated in timing correlator 44 with the actual $s(t)$ signal available on lead 27. Correlator 44 may be of the same type as tap correlators 34 and include multiplier and integrator circuits. (See, in this connection FIG. 8 of U.S. Pat. No. 3,403,340 issued Sept. 24, 1968.) The output of correlator 44 is periodically sampled in sampler 45 at the test pulse rate to form the partial derivative on lead 46 of the system error signal with respect to the sampling instant $t_o$ in accordance with equation (11). The signal on lead 46 is used to advance or retard the phase of the timing signal in timing circuit 28 in a direction to minimize the error signal $E$.

The desired signal wave at junction 47 is also shifted in phase by 90 electrical degrees in phase shifter 48. Such a phase shift imparted to all signal frequency components of the desired signal is equivalent to taking its Hilbert transform as is well known. The signal in the output of phase shifter 48 is thus the term $\hat{q}(t-t_o)$ appearing in equations (10) or (11) above. This signal is correlated in correlator 49 with the received signal $s(t)$ as indicated. Correlator 49 includes a multiplier and integrator, as do correlators 34 and 44. The correlator output is sampled at the test pulse rate in sampler 50 to form the partial derivative of the error signal with respect to the demodulating carrier phase $\theta$ in accordance with equations (9) or (10). This derivative signal when applied to local carrier source 21 in FIG. 2 can be used in a conventional way to adjust the carrier phase in a direction to minimize the error signal. Conventional ways of controlling the phase of an oscillator include phase-locked loops, reactance circuits, or countdown circuits with added or blocked pulse means.

Figure 4:
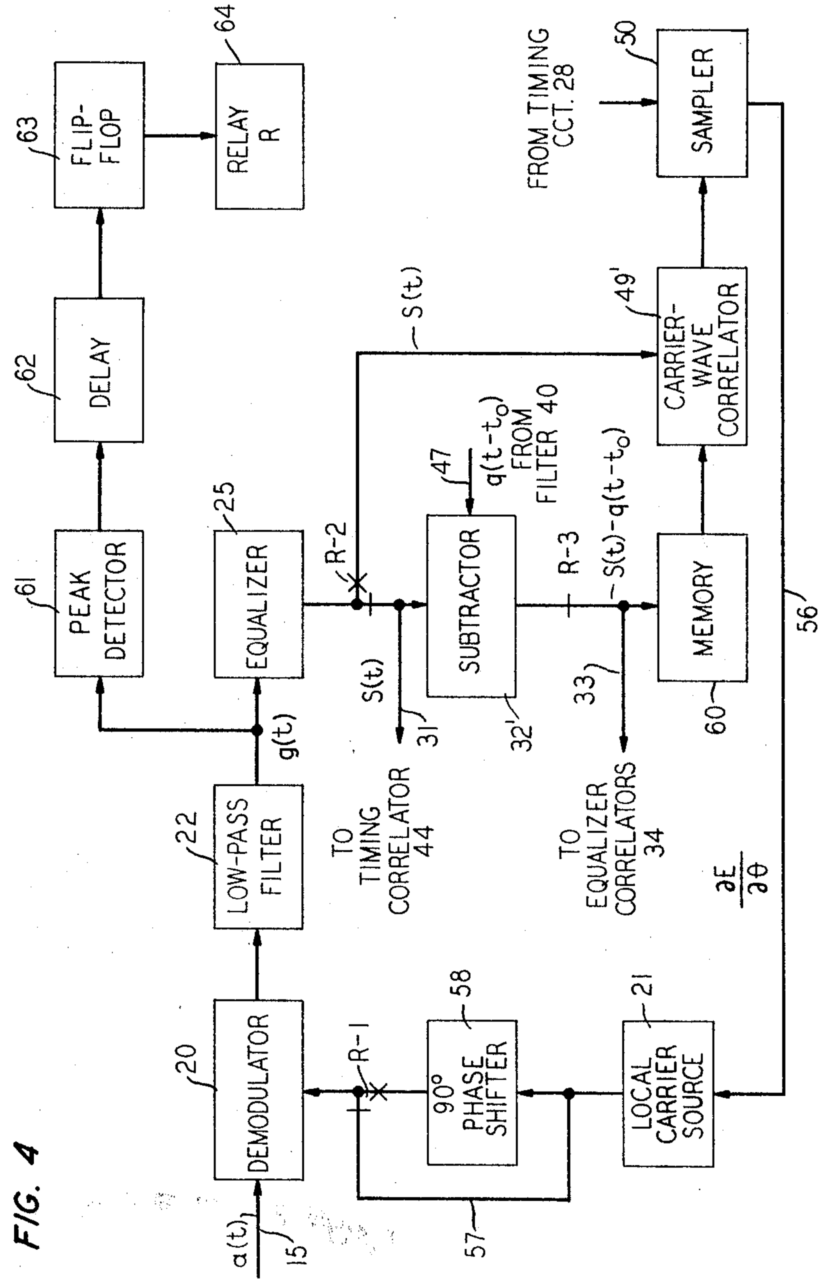
FIG. 4 is a block diagram of the receiver for an equalized double-sideband modulated or vestigial-sideband modulated digital data transmission system modified according to this invention to set jointly with equalizer tap weights and sampling time the additional parameter of demodulating carrier phase.

While the setting of equalizer tap gains and sampling time phase can be accomplished by the embodiment of FIG. 2 for any type of amplitude modulation, carrier-wave phase can be thus controlled only in the single-sideband modulation case. Where the position of the carrier-wave component lies within the transmission band of the channel, equation (13) must be implemented instead. FIG. 4 shows the modifications necessary to accomplish carrier phase control in double and vestigial sideband amplitude modulation systems.

In FIG. 4 demodulator 20, local carrier-wave source 21, low-pass filter 22 and equalizer 25 bear the same relationships as in FIG. 2. However, samples must be taken at two consecutive test pulse times in order to implement equation (13). Therefore, switching relay 64 controlled by a bistable circuit (flip-flop) 63 is provided. By virtue of peak detector 61 and delay circuit 62, the peak of each test pulse is monitored and causes a change of state by flip-flop 63 just before the next test pulse is expected.

Local carrier source 21 in FIG. 4 is connectable to demodulator 20 directly by way of lead 57 and the break portion of transfer contact R–1 controlled by relay R and through 90-degree phase shifter 58 and the make portion of transfer contact R–1.

Subtractor 32' is the same in function as subtractor 32 in FIG. 3. However, because of the presence of transfer-contact R–2 and break-contact R–3, both controlled by relay R, subtractor 32' is functional only on odd-numbered test pulses, at which time its difference signal output is stored in memory 60. Memory 60 may be a conventional capacitive store and is effective for one test pulse period.

Carrier-wave correlator 49' in FIG. 4 is the same functionally as correlator 49 in FIG. 3. However, because of the make portion of transfer contact R–2 correlator 49' is effective on even-numbered test pulses only. Its output when formed is sampled in sampler 50 and applied over lead 56 to control the phase of carrier source 21.

In operation relay R is normally released so that phase shifter 58 is bypassed by lead 57 and subtractor 32' is in circuit between equalizer 25 and memory 60. On the arrival of the first test pulse demodulation with the normal carrier-wave phase occurs and the output of equalizer 25 is subtracted from the ideal or desired response $q(t-t_0)$ on lead 47 to form the output $[s(t)-q(t-t_0)]$. This latter output and the output $s(t)$ are used as with the circuit of FIG. 3 to form control signals for tap gain and timing phase control. However, the difference output is stored in memory 60. The peak of the demodulator and the filtered test pulse $g(t)$ is detected in detector 61, delayed for somewhat less than the interpulse period to change the state of flip-flop 63 and cause the operation of relay R.

Because of the operation of relay R, the next test pulse is demodulated by a carrier wave whose phase has been shifted 90 degrees in phase shifter 58. The resultant output $\underline{s(t)}$ of equalizer 25 is now connected directly to correlator 49', where the $\underline{s(t)}$ signal is operated on by the stored difference signal. The output of correlator 49' is sampled in sampler 50 and carrier source 21 is adjusted accordingly, The second test pulse is detected in detector 61 and flip-flop 63 is made to change state again and release relay R.

The two-pulse sequence above is repeated automatically until the last test pulse is received. Thus, all odd test pulses are demodulated by the normal phase of carrier source 21 and all even test pulses are demodulated by the quadrature phase of carrier wave source 21. The resultant $s(t)$ and $\underline{s(t)}$ outputs of equalizer 25 are then used to implement the correlation defined by equation (13), thereby to control the demodulating carrier phase. It is apparent that somewhat more complicated circuitry is required for the DSB and VSB cases and that the settling time is likely to be twice that of the SSB case.

Inasmuch as equalizer 25 is conventionally provided with a reference tap whose output is maintained at a regulated value, the present invention is also controlling received signal amplitude, a parameter of great importance when multilevel symbols are being transmitted. This is in effect an automatic gain control.

In the joint method of this invention, the parameters $\theta$, $t_0$ and $e_n$ are set jointly in a training period prior to message data transmission. In the training period, isolated test pulses are transmitted. Each transmitted test pulse generates a signal at the equalizer output. From the equalizer output there are computed the required partial derivatives whose algebraic signs indicate in which direction each of the controlled parameters should be changed in order to minimize the mean-square error. After the changes prescribed have been made, another test pulse is transmitted and the process is repeated. When all partial derivatives have been reduced to zero, the parameters are locked and the training period is terminated. Then, for example, the receiver timing circuit is switched to the symbol timing mode. It is also apparent from known equalizer techniques that the joint settings of this invention could be made adaptively if the test pulses were interleaved with message data at distinguishing levels, for example, or if test pulses were replaced by pseudorandom words superimposed on message data.

It is to be understood that the foregoing description of specific embodiments of this invention is made by way of example only and is not to be considered as a limitation of its scope.

I claim:

1. In combination with a receiver for a synchronous data transmission system provided with a transversal equalizer in which attenuators connected to spaced taps thereon are adjusted in accordance with the correlation of received samples of test signals appearing at such taps with an error signal obtained from the difference between the summed equalizer output and locally generated reference waves:

sampling time recovery means, means jointly responsive to the time derivative of said reference waves and said equalizer output for controlling the phase of said sampling time recovery means in a direction to minimize said error signal, local oscillator means for generating a demodulating carrier wave, and means jointly responsive to said reference waves and said equalizer output for adjusting the phase of said demodulating carrier wave in a direction to minimize said error signal.

2. The combination defined in claim 1 in which said test signals are modulated onto a single-sideband of the carrier wave and said means for adjusting the phase of the demodulating carrier wave correlates said equalizer output with said shaped reference waves shifted into relative phase quadrature with those generating said error signals.

3. The combination defined in claim 1 in which said test signals are modulated onto a single sideband of the carrier wave and said means for adjusting the phase of the demodulating carrier wave correlates said shaped reference waves with said equalizer output shifted in phase by 90 degrees.

4. The combination defined in claim 1 in which said test signals are modulated into a frequency bandwidth exceeding that occupied by a single sideband of the carrier wave and said means for controlling the phase of the demodulating carrier wave correlates the stored difference between a first equalizer output derived from the demodulating carrier wave in normal phase and said shaped reference waves and a second equalizer output derived from the quadrature phase of said demodulating carrier wave.

5. The combination defined in claim 4 in which said test signals are modulated onto double sidebands about said carrier wave.

6. The combination defined in claim 4 in which said test signals are modulated onto a vestigial sideband of said carrier wave.

7. Apparatus for concurrent adjustment of critical parameters in a receiver for a synchronous data transmission system in accordance with a single performance criterion comprising in combination:

a transmitting terminal, a transmission channel and a receiving terminal, means at said transmitting terminal for applying a first train of test pulses at a subsynchronous rate to said channel, and said receiving terminal comprises:

means for generating a second train of test pulses matching said first train;

a shaping filter responsive to said second train of pulses for generating reference waves having a predetermined impulse response;

a transversal equalizer having an output formed from a summation of the attenuated individual contributions of a plurality of spaced taps thereon, each provided with an adjustable attenuator;

timing means controlling said generating means and including phase adjusting means;

subtracting means jointly responsive to said equalizer output and to said reference waves to form an error difference signal;

means for correlating said error difference signal with signals at each tap of said equalizer to form first control signals for the attenuators associated with such taps, said attenuators being adjusted in accordance with said control signals to reduce said difference signal;

means for differentiating said reference wave;

means jointly responsive to said equalizer output and to said differentiating means for furnishing a second control signal to said timing means for control of the phase adjusting means therein;

a demodulating carrier-wave source also including phase adjusting means; and means jointly responsive to the quadrature component of one and the direct component of the other of said reference wave and said equalizer output for controlling the phase adjusting means in said carrier-wave source.

8. A method for setting jointly in a receiver for a synchronous data transmission system provided with a transversal equalizer, a demodulating carrier-wave source and a timing-wave source the parameters of equalizer tap gain, carrier-wave phase and sampling time according to a common performance standard comprising the substantially simultaneous steps of:

receiving a first plurality of test pulses subject to distortion by said system, generating a second plurality of identical test pulses shaped in accordance with a desired system response, comparing said first and second pluralities of test pulses to obtain an error difference signal, differentiating said shaped pulses, correlating said error difference signal with the individual tap outputs of said equalizer to form first control signals for equalizer tap gain adjustments, correlating said first plurality of pulses as shaped by said equalizer with the differentiated and shaped second plurality of pulses to form second control signals for sampling time adjustment of said timing wave source, and correlating said first plurality of pulses as shaped by said equalizer with a component of the shaped second plurality of pulses to form third control signals for phase adjustment of said carrier-wave source.

9. The method of claim 8 in which said first plurality of pulses are modulated onto a single sideband of the carrier wave and the correlation forming said third control signal is between a direct component of one and a quadrature component of the other of said first plurality of pulses as shaped by said equalizer and of said second plurality of pulses as shaped into the desired system response.

10. The method of claim 9 in which the frequency components of said first plurality of pulses are modulated onto more than one sideband of the carrier wave and the correlation forming said third control signal is between said error difference signal derived from normally demodulated odd-ordered members of said first plurality of pulses and the following even-ordered members of said first plurality of pulses demodulated by a quadrature carrier-wave component and shaped by said equalizer.